Figure 4:
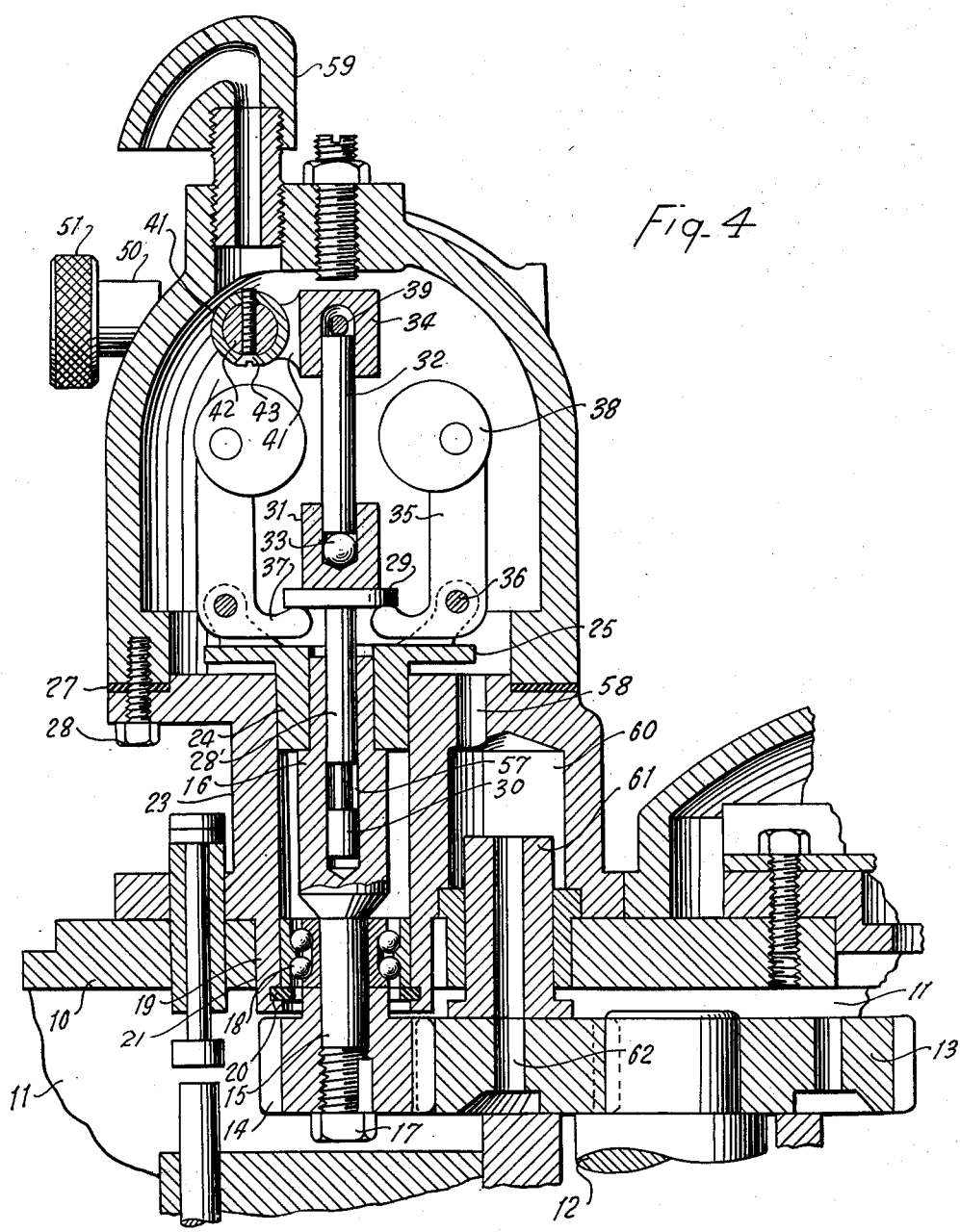

Aug. 19, 1952  J. C. SLONNEGER  2,607,578
ENGINE GOVERNOR DAMPENER
Original Filed March 14, 1946  2 SHEETS—SHEET 1
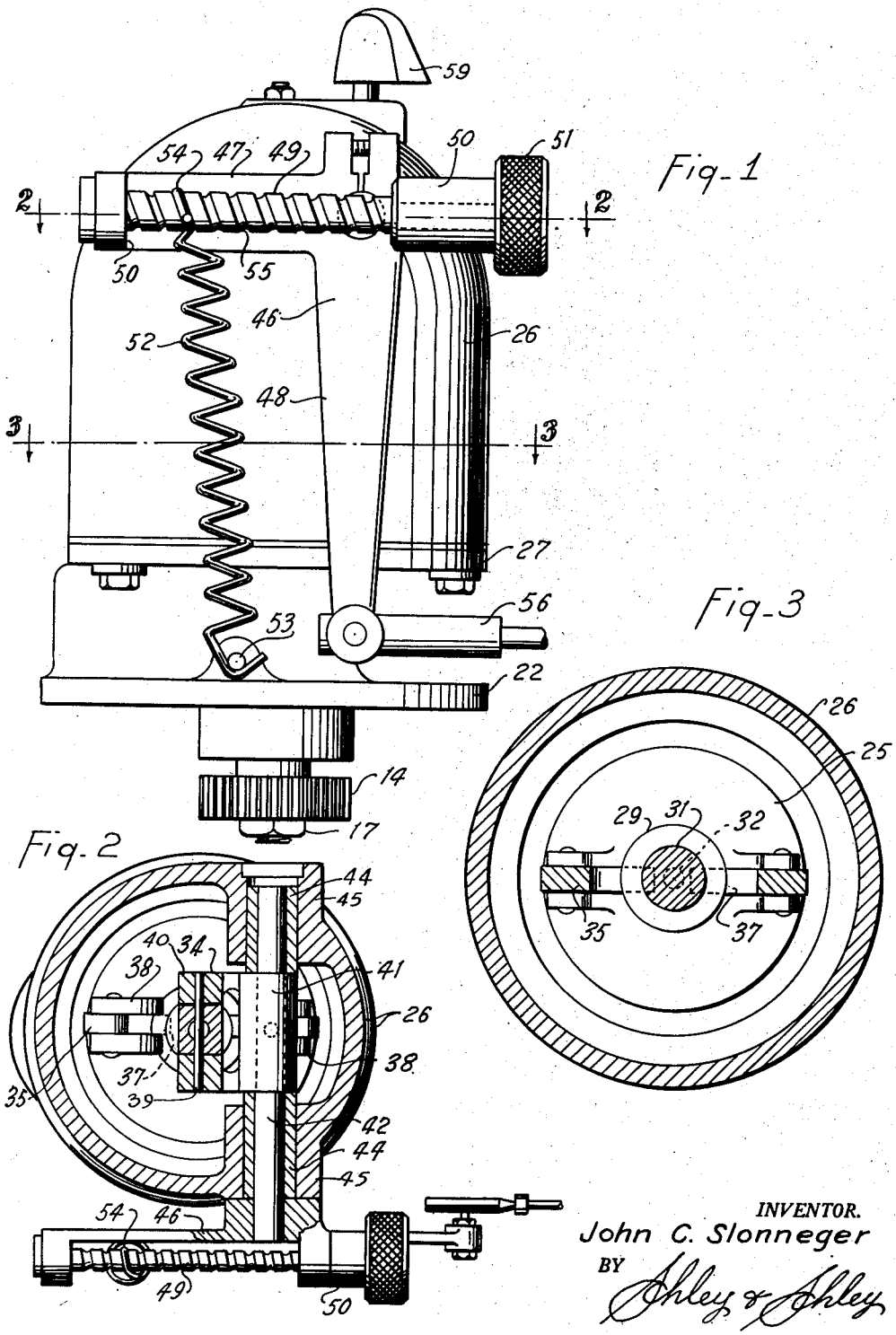
INVENTOR.
John C. Slonneger
BY
Ahley & Ahley
ATTORNEYS Aug. 19, 1952  J. C. SLONNEGER  2,607,578
ENGINE GOVERNOR DAMPENER
Original Filed March 14, 1946  2 SHEETS—SHEET 2

INVENTOR.
John C. Slonneger
BY
Ashley & Ashley
ATTORNEYS

Patented Aug. 19, 1952

2,607,578

UNITED STATES PATENT OFFICE 2,607,578

ENGINE GOVERNOR DAMPENER

John C. Slonneger, Dallas, Tex., assignor to The Continental Supply Company, Dallas, Tex., a corporation of Delaware Application January 3, 1948, Serial No. 457, which is a division of application Serial No. 654,427, March 14, 1946, now Patent No. 2,590,134, dated March 25, 1952. Divided and this application November 3, 1949, Serial No. 125,290

6 Claims. (Cl. 264—15)

This invention relates to new and useful improvements in engine governor dampeners.

One object of the invention is to provide an improved governor dampener wherein damping means is utilized to control the centrifugal displacement of the arms of the speed-responsive means and thus, retard or dampen said speed-responsive means under certain load conditions, which will prevent collapsing of the speed-responsive means upon a sudden reduction in speed with the consequent sudden opening of the engine throttle and conversely, if the speed should be suddenly increased, the speed-responsive means will be retarded or damped and smoother engine operation will result.

Another object of the invention is to provide a dampener having a liquid damping plunger coacting with the governor arms to control the outward displacement of said arms and also coacting with spring-pressed throttle means for controlling the throttle actuation of the engine under varying loads and speeds.

A further object of the invention is to provide an improved damping means combined with the rotating governor shaft, whereby a simplified, efficient and compact structure is obtained.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevation of a governor constructed in accordance with the invention, Fig. 2 is a horizontal cross-sectional view taken on the line 2—2 of Fig. 1, Fig. 3 is a reduced horizontal cross-sectional view taken on the line 3—3 of Fig. 1, and Fig. 4 is a slightly enlarged vertical sectional view of the governor showing its lubricating and driving means.

This application is a division of my co-pending application filed January 3, 1948, Serial No. 457, which in turn was a division of a then co-pending application filed March 14, 1946, Serial No. 654,427, now Patent No. 2,590,134.

In the drawings, the numeral 10 designates the top wall of an engine crankcase 11. The upper end of the camshaft 12 has a horizontal gear 13 fastened thereon. This gear drives a horizontal pinion 14 fastened on the lower end of the reduced shank 15 of a vertical, tubular governor shaft 16, by means of a nut 17. At the intersection of the shank and the tubular portion of the governor shaft, a horizontal ball bearing assembly 18 is provided for rotatably supporting said shaft. The bearing assembly is mounted in a collar 19 and held in place by a retaining ring 20. The collar fits in a circular opening 21 formed in the top wall 10 of the crankcase and depends from the bottom of a flanged governor base 22 which is bolted on said top wall. The governor shaft is enclosed within and spaced from a sleeve 23 connecting the flanges of the base. The upper end of the shaft is reduced and has fastened thereon the hub 24 of a transverse grooved bracket 25, which hub rotates in the upper end of the sleeve and extends thereabove.

A dome-shaped governor housing 26 is secured in an annular recess 27 in the top flange of the housing by means of bolts 28. The shaft 16 terminates below the upper end of the hub 24 and receives a vertically slideable plunger 28'. This plunger carries a thrust disk 29 on its upper end. The lower end of the plunger carries a piston 30 which has a loose sliding fit in the bore of the tubular governor shaft. The piston operates in an oil bath which lubricates the plunger and damps its action. A cylindrical cup 31 is secured, axially of the plunger, on the disk 29 and receives the lower end of a detent 32 which rests upon a ball 33 in said cup. The upper end of the detent engages in an inverted cup 34.

Since the governor shaft 16 is rotatable, the hub 24 and the bracket 25 are likewise rotatable; the bracket rotating in the lower portion of the governor housing and the plunger being slideable therethrough. Angular governor arms 35 are mounted in the grooved ends of the bracket on pins 36 and have inwardly-directed fingers 37 which engage between the disk 29 and the bottom of the bracket. Weights 38 disposed on the upper ends of the arms overhang the fingers and tend to swing the arms toward the detent. The governor arms work in the usual manner, whereby the weights are displaced outwardly as the speed of rotation increases, whereby the plunger 28' is elevated which carries the cup 31 and the detent 32 upwardly.

The upper cup 34 is pivoted on a transverse pin 39 in the yoke 40 of an arm 41 extending laterally from a rock shaft 42; said arm being fastened on the shaft by a pin 43. The shaft is journaled in bearing sleeves 44 extending through bosses 45 in the upper portion of the housing 26. The upper end of the detent 32 bears against the pin 39. This shaft extends through one side of the housing and has clamped on its extended end, a bellcrank lever 46. The lever includes an upper horizontal arm 47 and a depending arm 48. A spiral-grooved shaft 49 is journaled in spaced ears 50 along the outer side of the arm 47. A knurled knob 51 is fastened on one end of the shaft for rotating the same. A coiled spring 52 has its lower end engaged over a stud 53 on the exterior of the governor base 22. The upper end of the spring is formed into a hook 54 which is engaged in the spiral groove 55 of the shaft 49.

It will be observed that when the governor shaft 16 is revolved and the arms 35 are displaced outwardly, the disk 29 will be lifted, and consequently the detent 32 and cup 34 will swing the arm 41, whereby the shaft 42 will be rocked, which in turn, will rock or swing the lever 46. By this arrangement, the amplitude of the swing of the long arm 48 of the lever 46 will be controlled by the centrifugal action of the governor. Further, it will be seen that since the arm 47 extends laterally from the rock shaft 42 on the same side of said shaft as the arm 41, the spring will exert a downward force upon the plunger 28' through the elements connected therebetween. The pull of the spring 52 is reflected in leverage determined by the spacing of the hook 54 from the shaft 42 on which the lever is fastened. If the knob is turned to move the hook closer to said shaft, this leverage is reduced, but if the rotation of the shaft is reversed to move the spring hook outwardly, then the leverage is increased; also as the hook 54 is moved outwardly on the shaft, the spring will be adjusted at an increasing angle to the perpendicular, and therefore, its tension will be increased. The lower end of the lever arm 48 is pivotally connected to a throttle rod 56 which is suitably attached to the throttle of a carburetor (not shown) or other fuel device.

The forces exerted by the centrifugal action of the governor and the extension of the spring 52 seek a balance. For setting up a damping action the plunger 28' is reduced just above the piston 30 to provide an oil space 57 in the bore of the shaft 16. An increase in speed will raise the plunger 28' and if this occurs suddenly, a partial vacuum will be produced below the piston 30 because of the comparatively slow by-passing of the oil balance confined in the governor shaft. This vacuum, of course, slightly retards the action of the governor and momentary slight overspeeding may result. If the increase in speed is maintained, the plunger will be further elevated as the oil completely fills the bore below the piston and thus relieves the force of the partial vacuum on the plunger. Now if the speed should be suddenly decreased, the plunger can move downwardly only as rapidly as the unbalanced force acting downward causes the piston to by-pass the oil trapped thereunder. By controlling the clearance between the piston and the bore of the governor shaft, the rate at which the oil by-passes is regulated and thus, upon the downward motion of the plunger, a greater retarding or damping action may be obtained than during the upward motion thereof.

It is, of course, understood that the governor is so connected to the throttle of the carburetor that an upward motion of the plunger 28' causes the throttle to move toward a closed position and upon a downward movement of the plunger, to move toward an open position. In view of the foregoing, it is pointed out that because of the damping or retarding action, the throttle may be closed quickly, thereby preventing the engine from overspeeding, but the throttle cannot be opened as rapidly. In all speed changes, the piston 30 exerts a damping action to steady the speed of the engine.

Where the engine is used with a comparatively rapidly fluctuating load, as for instance where an oil well pump is being driven, the damping action has the effect of producing substantially no movement of the throttle valve since the governor assumes substantially an average position, due to the fact that the governor does not react to momentary speed changes, as will be obvious from the foregoing description. Should the average load be definitely changed, the spring and governor weights will slowly assume a new average position to maintain balance, but it is pointed out that if the change of load or speed is of short duration, there may be substantially no change in the position of the throttle.

In ordinary governors, the mechanism is so constructed that a sudden reduction in speed will cause the governor weights to collapse, which will result in a sudden opening of the throttle. However, the damping action herein described avoids this condition and the throttle will open in a comparatively even and steady manner. It is pointed out that the sensitivity of the governor is not impaired by this oil damper. On the contrary, the arrangement of the spiral shaft 49 and spring 52 provides for very accurate adjustment as to speed which the governor will maintain under rapidly fluctuating loads.

The knob 51 provides a convenient means for adjusting the governor for predetermined speeds and such adjustment provides for a very broad speed range. As has been before pointed out, this is due to the leverage effect of the spring 52 on the lever 46. By this arrangement, a wide range of speed adjustments may be accomplished and the sensitivity proportionately maintained.

As hereinbefore stated the governor is self-lubricating. The top part of the base 22 has a port 58 and a vent 59 to the atmosphere is provided in the top of the housing 26. The port 58 establishes communication between the housing and a chamber 60 in the base. The chamber has a sliding nipple 61 in its lower end riding upon the gear 13 which latter has ports 62 adapted to register with the nipple and periodically open the crankcase 11 to the atmosphere, whereby oil entrained in an air stream will flow into the housing.

The centrifugal action of the whirling arms 35 will separate the oil droplets from the air stream. Some of the oil will fall upon the bracket 25 and flow down around the plunger; some of said oil will flow down between the hub 24 and the bore of the sleeve 23, through the ball bearing assembly and return to the crankcase; while a surplus of oil will pass down through the port 58. This separation of the oil from the air stream by means of the arms 35, makes the governor self-lubricating.

It is pointed out that no positive locking means such as nuts or other fastening means, which require loosening before adjustments can be made and thereafter, must be tightened. Because the diameter of the shaft 49, through the bottom of the groove 55, is less than the diameter of the shaft 42 and since a comparatively large resilient force acts on the shaft 49, the latter is locked against unintentional rotation, when adjusted. This arrangement makes the regulator, for practical purposes, self locking.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An engine governor including, an enclosure having speed-responsive means therein, a governor shaft rotatable in the enclosure, the shaft having therein a recess with a closed bottom and a closed side wall a plunger having a vertically sliding movement in the recess, the shaft having an oil space in the recess around the plunger, and damping means at said oil space at the lower end of the plunger.

2. An engine governor including, a housing, a base supporting the housing, a tubular governor shaft rotatable in the base, governor arms pivoted to the shaft, the shaft having therein a recess with closed bottom and side walls a plunger slideable in the recess and having means engaging the arms, the plunger having a reduced portion providing an oil space in the shaft recess, and a piston on the lower end of the plunger below the oil space and within the recess.

3. An engine governor damping means including, a rotatable shaft having a recess with closed bottom and side walls and a body of liquid confined in said recess, speed responsive means, and a member connected with the speed responsive means movable longitudinally in the recess having a portion immersed in the body of liquid.

4. An engine governor damping means including, a rotatable shaft having a recess with closed bottom and side walls and a body of liquid confined in said recess, speed responsive means, a member connected with the speed responsive means movable longitudinally in the recess, and a piston on the member immersed in the body of liquid within the recess, there being a restricted flow passage along the piston within the recess.

5. An engine governor damping means including, an enclosure having a bore, a hub rotatable in the upper end of the bore, a bracket fixed on the hub, governor arms pivoted to the bracket, a rotatable shaft secured to the hub having a longitudinal bore open at the top of the shaft the bottom and side walls of the bore being closed, a plunger movable in the bore of the shaft, a thrust member on the upper end of the plunger engaging the governor arms, the bore having a body of liquid in its lower end, and a damping member on the lower end of the plunger extending into the body of liquid.

6. An engine governor damping means including, an enclosure having a bore, a hub rotatable in the upper end of the bore, a bracket fixed on the hub, governor arms pivoted to the bracket, a rotatable shaft secured to the hub having a longitudinal bore open at the top of the shaft the bottom and side walls of the bore being closed, a plunger movable in the bore of the shaft, a thrust member on the upper end of the plunger engaging the governor arms, the bore having a body of liquid in its lower end, and a piston on the lower end of said plunger, there being a by-pass passage between the piston and the wall of the shaft bore, the plunger being reduced in diameter immediately above the piston, whereby a liquid space is provided within said bore.

JOHN C. SLONNEGER.

REFERENCES CITED

The following references are of record in the file of this patent:

UNITED STATES PATENTS

| Number | Name | Date |
| --- | --- | --- |
| 8,148 | Corliss | June 10, 1851 |
| 1,265,883 | Church | May 14, 1918 |
| 2,364,817 | Reggio | Dec. 12, 1944 |